Nov. 2, 1965  R. WHITMAN  3,214,894
CROP HARVESTER
Filed June 11, 1964  2 Sheets-Sheet 1
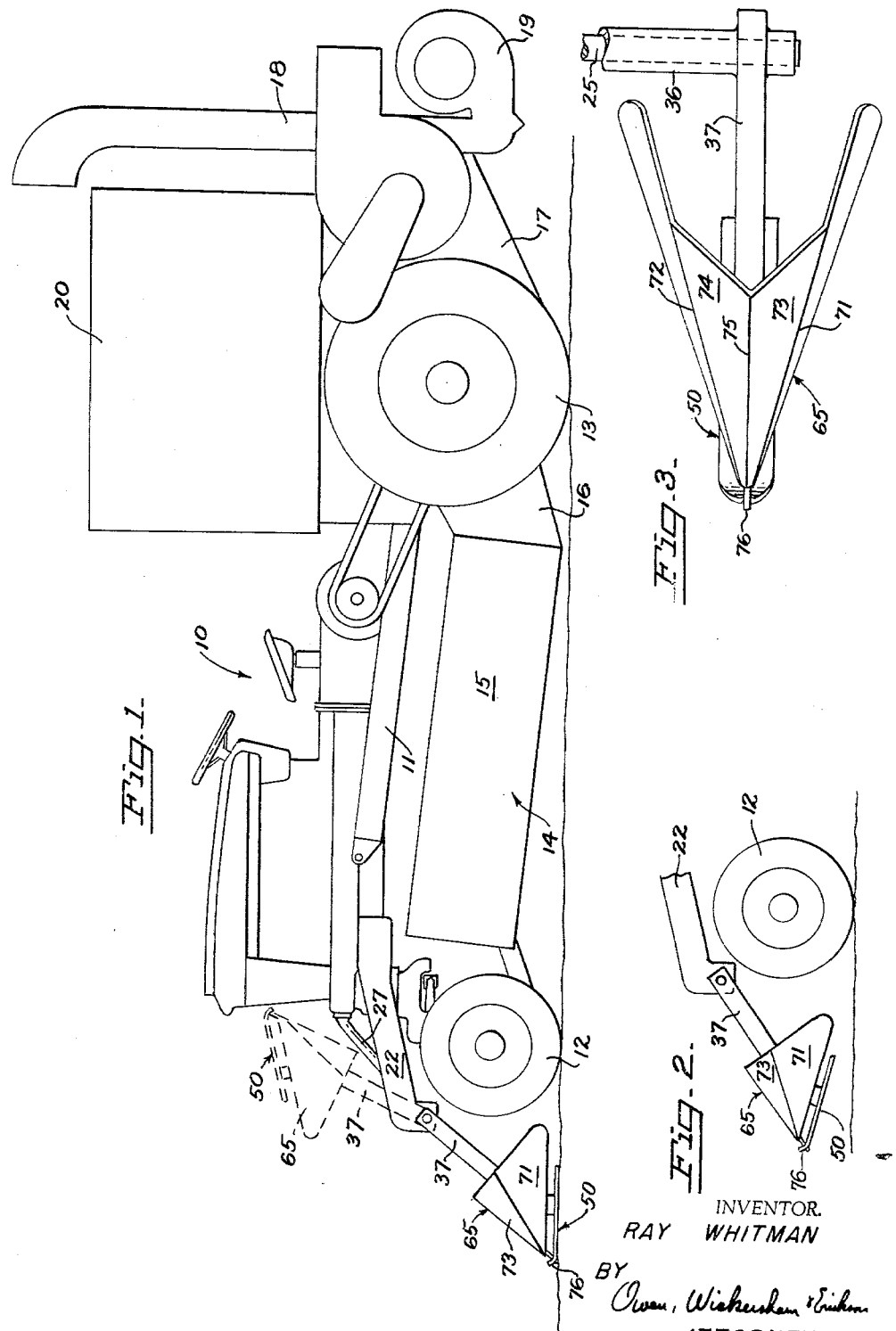
INVENTOR.
RAY WHITMAN
BY Owen, Wickersham & Erickson
ATTORNEYS

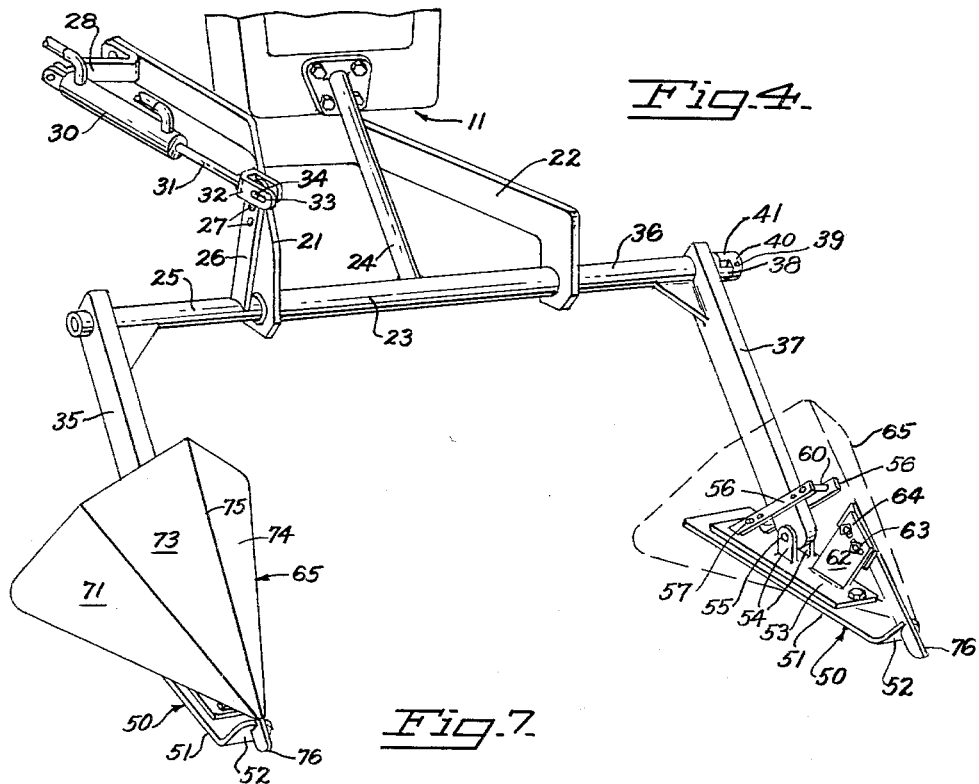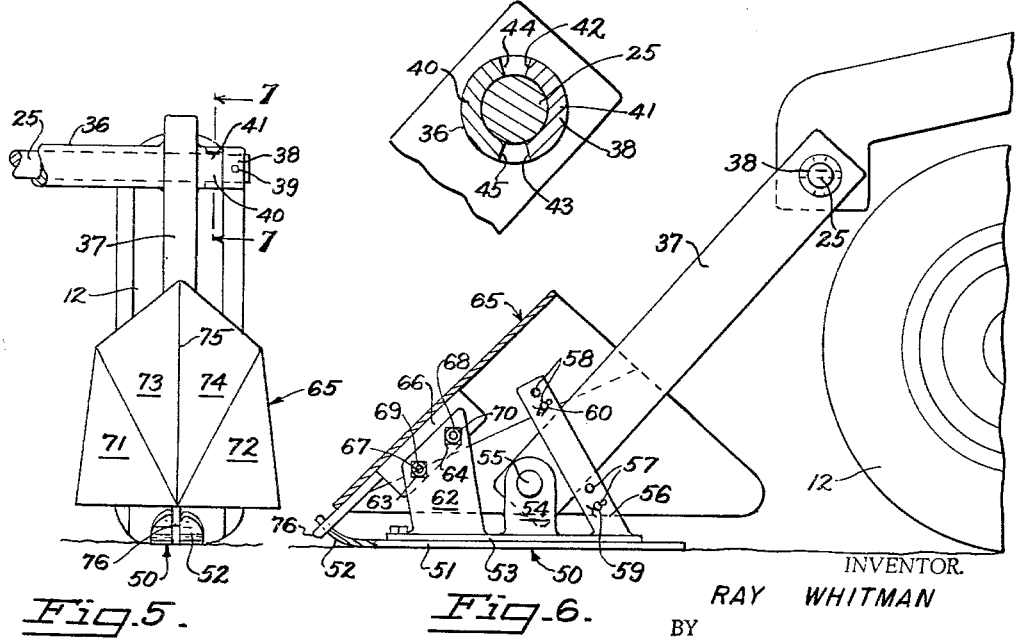

United States Patent Office 3,214,894
Patented Nov. 2, 1965

3,214,894
CROP HARVESTER
Ray Whitman, 216 N. 6th St., Patterson, Calif.
Filed June 11, 1964, Ser. No. 374,345
7 Claims. (Cl. 56—119)

This invention relates to improvements in agricultural crop harvesters. More particularly, it relates to an improved fender or wheel-guarding device for harvesters.

The invention is particularly useful in, but not limited to, the harvesting of pod-type crops, such as snap beans, string beans, peas, and blackeye peas, which grow on bushes or vines and tend to get entangled in the harvester wheels.

Mechanical harvesting always gives rise to some problems not met with in hand harvesting. One such problem is to keep the wheels of the harvester or its tractor from damaging the crop; another is to keep the plants from entangling with the wheels. While it has become common practice to provide some sort of shield device forward of the front wheels of bean and other harvesters, these shield devices have heretofore failed to accomplish the intended purposes with full satisfaction. Moreover, they have decreased the mobility and useful range of the harvester by substantially increasing its length. They could usually be raised somewhat above the ground, to make turning somewhat easier, but at all times they still projected several feet in front of the harvester. Usually they could be raised only in conjunction with the raising of several other elements; there was no independent control nor any way of achieving it.

Another problem was that, while the shields usually were connected to shoes or similar devices which floated over the ground to maintain the shields at the proper height, this floating action tended to result in attendant disadvantages. For, as mud accumulated on the bottom of the shoe, the shoe tended to be pushed higher and higher above ground level until it actually raised the shield out of a useful position. Moreover, there was no adequate way of enabling the shield-shoe units to float with respect to the crop without causing other complications.

The present invention provides a fender, guard, or shield mechanism that can be held down positively to a maximum float height, so that deposits do not force it gradually to rise; yet there is a floating action, this action being limited to a small predetermined range. Since the shoe is urged down positively, it is kept scouring over the surface, thereby keeping the shoe cleaned off and preventing mud from building up, even during moist weather and even when the ground is muddy. The same action that keeps the shoe down enables the unit to pass beneath and through the crop plants in such a way that the shield acts to lift the plants and guide them into the harvesting mechanism.

The invention also mounts the guard or shield device to the frame in a manner that enables the operator to swing that device out of the way and thereby to shorten the length of the harvester by about forty inches, for truck transport of the harvester and at other times when it is not actually being operated as a harvester. Two harvesters embodying this invention can be transported on a single truck trailer, instead of having to use one trailer per harvester, as formerly. Moreover, when the entire shoe-guard-shield combination is raised out of the way behind and above the front wheels, the machine can be turned about a smaller radius.

The invention also provides a limited amount of independent angular motion of the shoe with respect to the shield and to the arms which support it. There is also a limited amount of lost motion between the shoe on one side of the harvester and that on the other side.

Other objects and advantages of the invention will appear from the following description of a preferred embodiment thereof.

In the drawings:

FIG. 1 is a view in side elevation of a bean harvester embodying the principles of the invention. A retracted position of the fender assembly is shown in broken lines, to illustrate how much the harvester is shortened by this retraction.

FIG. 2 is a fragmentary view in side elevation of the device of FIG. 1 with the fender assembly hydraulically raised above the ground.

FIG. 3 is a fragmentary top plan view of one shoe-guard unit showing its connection to the shaft.

FIG. 4 is a fragmentary view in perspective of the fender assembly together with part of the main harvester frame, but omitting the wheels and many other parts. The right-hand guard cover is removed, its position being indicated in phantom.

FIG. 5 is a fragmentary view in front elevation of the parts shown in FIG. 3.

FIG. 6 is a fragmentary view in side elevation and partly in section of the same parts.

FIG. 7 is a fragmentary enlarged view in section taken along the line 7—7 in FIG. 5.

The drawings show a snap-bean harvester 10 having a frame 11, front wheels 12, and rear wheels 13. The rear wheels 13 are in line with the corresponding front wheels 12. In between and to the rear of the front wheels 12 is a bean picking assembly 14 preferably comprising picking reels with tines, covered by a housing 15, serving to deposit picked beans on a conveyor (not shown). A conveyor system including units 16 and 17 carries the picked beans aft while cleaning them and deposits them in an air conduit 18, where a stream of air from a fan 19 lifts them up and deposits them in a bin 20. All these features are covered by other patent applications and no explanation is required herein.

A frame 11 has a pair of forwardly extending members 21 and 22 that are higher than the front wheels 12 and lie in between them laterally and somewhat above them. They may, as shown, diverge from each other at their front ends. Between them, these two supporting members 21 and 22 carry a pipe 23, rigidly secured to them and preferably to a brace 24 that, like the members 21 and 22, is connected directly to the main frame 11.

Rotatably supported inside the pipe 23 is a shaft 25 which extends beyond both ends of the pipe 23 to points vertically in line with the two front wheels 12. A crank member 26 is rigidly secured to the shaft 25 and has a series of openings 27 at its outboard end. A bracket 28 secured to the main frame 11 supports a hydraulic cylinder 30 whose piston has a connecting rod 31 with a yoke 32 on its forward end. The yoke 32 has a pair of slots 33, and a removable pin 34 passes through the slots 33 and one of the openings 27, thereby securing the crank 26 to the connecting rod 31 by a lost motion connection, enabling limited rotation of the shaft 25 for any position of the rod 31. The series of openings 27 enable adjustment of the lifting range of the shaft 25.

An arm 35 is rigidly secured, as by welding, to one end of the shaft 25 and extends forwardly and downwardly therefrom. Rotatably mounted around the other end of the shaft 25 is a sleeve 36 to which a like arm 37 is rigidly secured, as by welding. Beyond the outboard end of the sleeve 36 is a stop collar 38 that is rigidly secured, as by a set screw 39, to the shaft 25; and the collar 38 and the sleeve 36 are joined by a lost-motion connection, comprising an outboard projection 40 of the sleeve 36 and an inboard projection 41 of the collar 38. The inboard collar projection 41 has stop ends 42 and 43 and the inboard projection 40 of the sleeve has stop ends 44 and 45 (FIG. 7).

To the lower and forward end of each arm 35, 37 a shoe 50 is pivotally secured. This may be done as shown in FIG. 6, where the shoe 50 has a skid 51 with an upturned front portion 52. A supporting base member 53 overlies the skid 51 and a pair of ears 54 extend up from the base 53. A pivot pin 55 connects the arm 37 (or 35) to the ears 54, giving a rotatable connection. A pair of brackets 56 extend upwardly and forwardly from the base 53 and are each provided with a pair of lower openings 57 and a pair of upper openings 58. A pin 59 is inserted through one set of the lower openings 57, and a pin 60 is inserted through one set of the upper openings 58. The pairs of upper and lower openings 57, 58 enable adjustment of the amount of rotation of the shoe 50 with respect to the arm 37 or 35 and determine the angle through which the shoe 50 can rotate with respect to the arm 37 or 35. Thus, the lower of the lower openings 57 gives a wider range of downward movement to the front end 52, while the upper set of the upper openings 58 gives a wider range of upward movement in that direction than the lower set of upper openings 58.

Another bracket 62 extends upwardly from the base 53 and is provided with a pair of forwardly and downwardly extending slots 63 and 64. These are used to secure a shield 65 which comprises a generally pyrimidal shell having a depending central support member 66 with two round openings 67, 68 therethrough through which bolts 69 and 70 secure it to the upstanding bracket 62. The slots 63, 64 enable adjustability of the shield position to the shoe position. The guard or shield 65 has its shell bent to provide two diverging side portions 71 and 72, which are generally vertical, inclined slightly in, and two upper portions 73 and 74 which are flatter and meet each other at a ridge line 75. From the forward end of the ridge line 75 extends a point 76. As the point 76 wears, the operator can loosen the bolts 69 and 70, slide the guard 65 forward with respect to the shoe 50, and then tighten them again, to put the point 76 in a lower position relative to the shoe; the point 76 should preferably scratch the earth.

Thus the shield 65 and shoe 50 have a limited floating rotational movement with respect to the arm 37 or 35, as limited by the upper and lower stop pins 60 and 59 in the upper and lower sets of openings 58 and 57. The sleeve-mounted arm 37 has a lost-motion connection with respect to the shaft 25, while the shaft 25 itself has a lost-motion connection with respect to the hydraulic cylinder's rod 31. However, the hydraulic cylinder 30, within the limits of these motions, can hold both of the shoes 50 down positively. Moreover, the hydraulic cylinder 30 can raise both shoes 50 upwardly to the position shown in FIG. 2, where they are well above the ground. This position may be used for making turns or movements where the shield 65 is not to be in use and where the limitations of overall length are not important.

In addition, by loosening the pin 34 and taking it out, the crank arm 26 is disconnected from the connecting rod 31, and the entire fender assembly can be rotated back, with the shoes 50 and guard 65 put in a position back of the wheels 12 and above them, as shown in broken lines in FIG. 1. In this position the length of the harvester is shortened about forty inches, which makes it possible, when taken in conjunction with other improvements shown in FIG. 1 but described and claimed in another patent application, to put two of these tractor harvesters 10 on a single truck trailer for transporting them, instead of having to use one long truck trailer per harvester.

Since the front and rear wheels 12 and 13 are in line with each other, the guards 65 for the front wheels not only divert the plants from the front wheels 12 but also act on behalf of the rear wheels 13.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. In a device for harvesting crops, including a tractor having a frame and front and rear wheels, the rear wheels being in line with the front wheels, said frame having support portions extending forward of and higher than said front wheels, the combination therewith of a fender assembly comprising:
   a horizontal shaft rotatably supported by said frame support portions and extending parallel to, above, and slightly forward of the center line between the two front wheels,
   means for positively rotating said shaft,
   a first arm rigidly secured adjacent one end of said shaft in line with one said front wheel,
   a sleeve rotatably mounted on said shaft adjacent the other end of said shaft and adjacent said other front wheel,
   a second arm rigidly secured to said sleeve in line with the other said front wheel,
   stop means secured to said shaft limiting the rotation of said sleeve, so that said sleeve floats on said shaft with a lost-motion action and so that said sleeve is raised by rotation of said shaft in the direction of rotation that raises said first arm,
   a shoe assembly pivotally secured to the forward end of each said arm and having a skid and an upstanding bracket member,
   stop means limiting the relative rotation of said shoe assembly with respect to its associated said arm,
   and a guard shield mounted on said upstanding bracket of said shoe, said shield providing a flaring generally pyramidal shell for warding away plants from said wheels and for urging said plants to an erect position.

2. The device of claim 1 wherein said shield has a forwardly and downwardly projecting point and is mounted to said bracket by means enabling adjustment of said point with respect to said shoe along a line extending downwardly and forwardly.

3. The device of claim 1 having locking means normally limiting said shaft to rotation to a predetermined angle, said locking means and said means for rotating said shaft in that angle including a hydraulic cylinder with a piston rod and means connecting said piston rod to a crank arm on said shaft.

4. The device of claim 3 wherein said means connecting said piston rod to said crank arm includes release means for releasing said crank arm from said rod, so that said shaft can be swung around to move said arms, shoes, and guards to an erect transporting position entirely rear of said shaft, said shaft and frame extending no substantial distance in front of the forward edge of the wheels.

5. In a device for harvesting crops, including a tractor having a frame and front and rear wheels, the combination therewith of a fender assembly comprising:
   a horizontal shaft rotatably supported by said frame above, and parallel to the center line between the two front wheels,
   means for positively rotating said shaft,
   a first arm rigidly secured adjacent one end of said shaft in line with one said front wheel,
   a sleeve mounted by a lost-motion connection on said shaft adjacent the other end of said shaft and adjacent said other front wheel, so that said sleeve floats on said shaft with the lost-motion action and so that said sleeve is raised by rotation of said shaft in the direction of rotation that raises said first arm, a second arm rigidly secured to said sleeve in line with the other said front wheel, a shoe assembly pivotally secured to the forward end of each said arm, and a guard shield secured to said shoe, said shield providing a flaring generally pyramidal shell for warding away plants from said wheels and for urging said plants to an erect position.

6. The device of claim 5 having a crank arm on said shaft and wherein the means for positively rotating said shaft comprise hydraulic means connected to said crank arm for rotating said shaft through a limited angle.

7. The device of claim 6 having release means for releasing said crank arm from said hydraulic means so that said shaft can be swung around to move said arms, shoes, and guards to an erect transporting position entirely rear of said shaft.

References Cited by the Examiner
UNITED STATES PATENTS

| | | | |
|---|---|---|---|
| 1,852,702 | 4/32 | Coultas et al. | 56—119 |
| 2,064,480 | 12/36 | Lock et al. | 172—517 X |
| 2,601,305 | 6/52 | Laun | 56—119 |
| 2,616,348 | 11/52 | Ariens | 172—277 X |
| 2,634,569 | 4/53 | Raney et al. | 56—119 X |

ABRAHAM G. STONE, *Primary Examiner.*

RUSSELL R. KINSEY, *Examiner.*